W. D. NASH.
COTTON CLEANING MACHINE.
APPLICATION FILED NOV. 9, 1912.
1,058,997.
Patented Apr. 15, 1913.
5 SHEETS—SHEET 2.
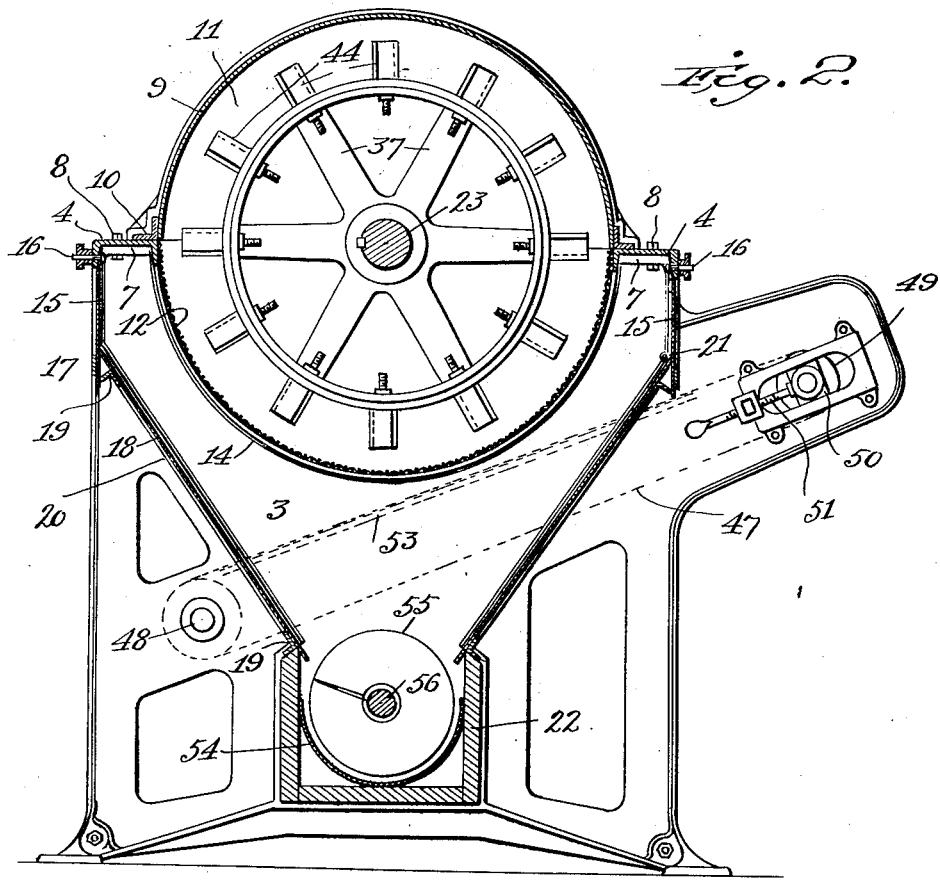
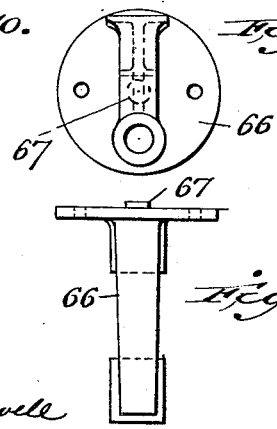
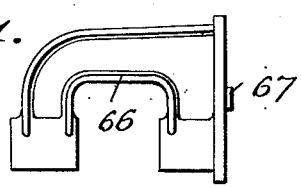

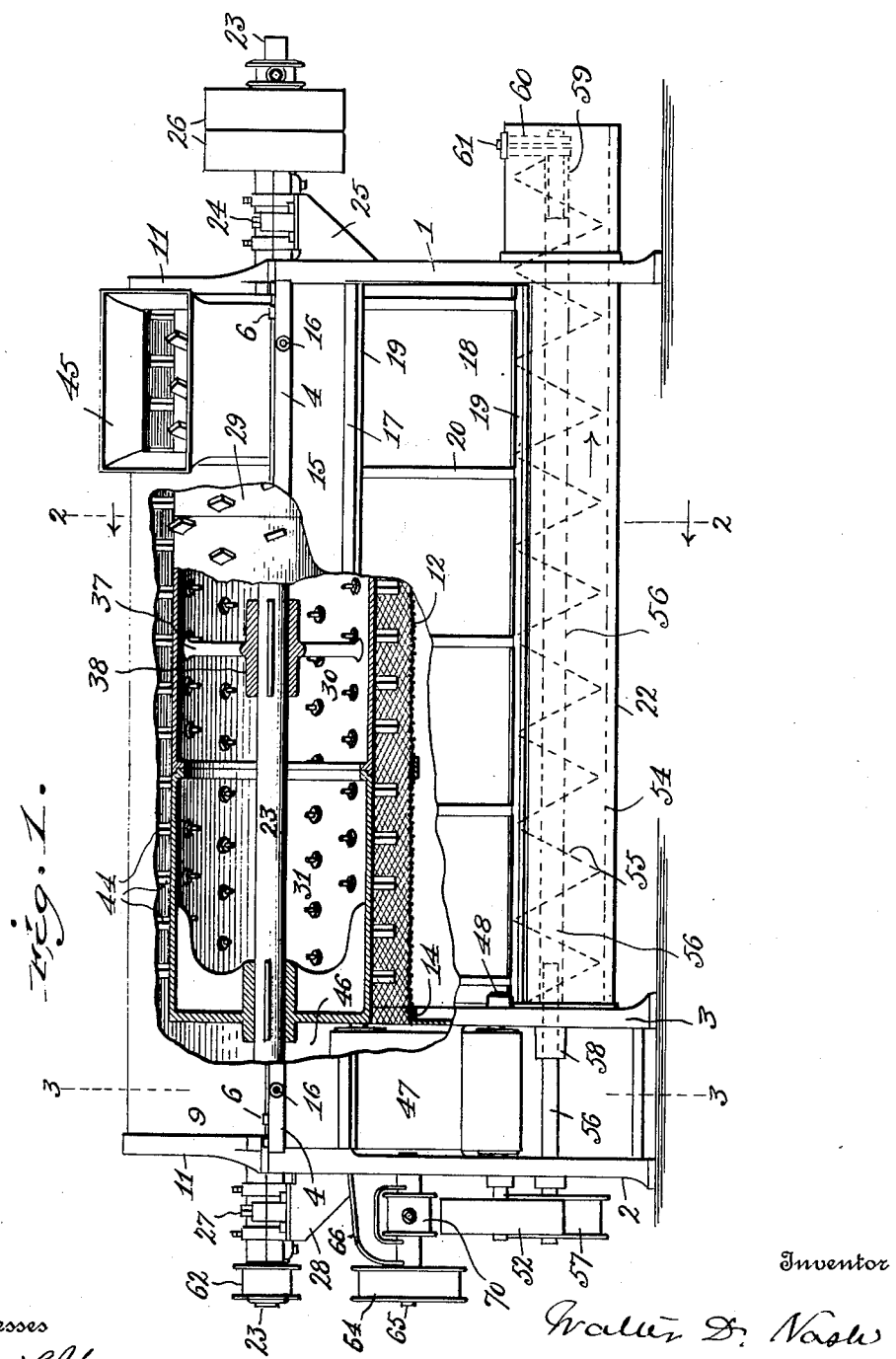

W. D. NASH.
COTTON CLEANING MACHINE.
APPLICATION FILED NOV. 9, 1912.

1,058,997.

Patented Apr. 15, 1913.

5 SHEETS—SHEET 3.

Witnesses
Edwin L. Yewell
Percy B. Hills

Inventor
Walter D. Nash
by
Grant Burroughs
Attorney

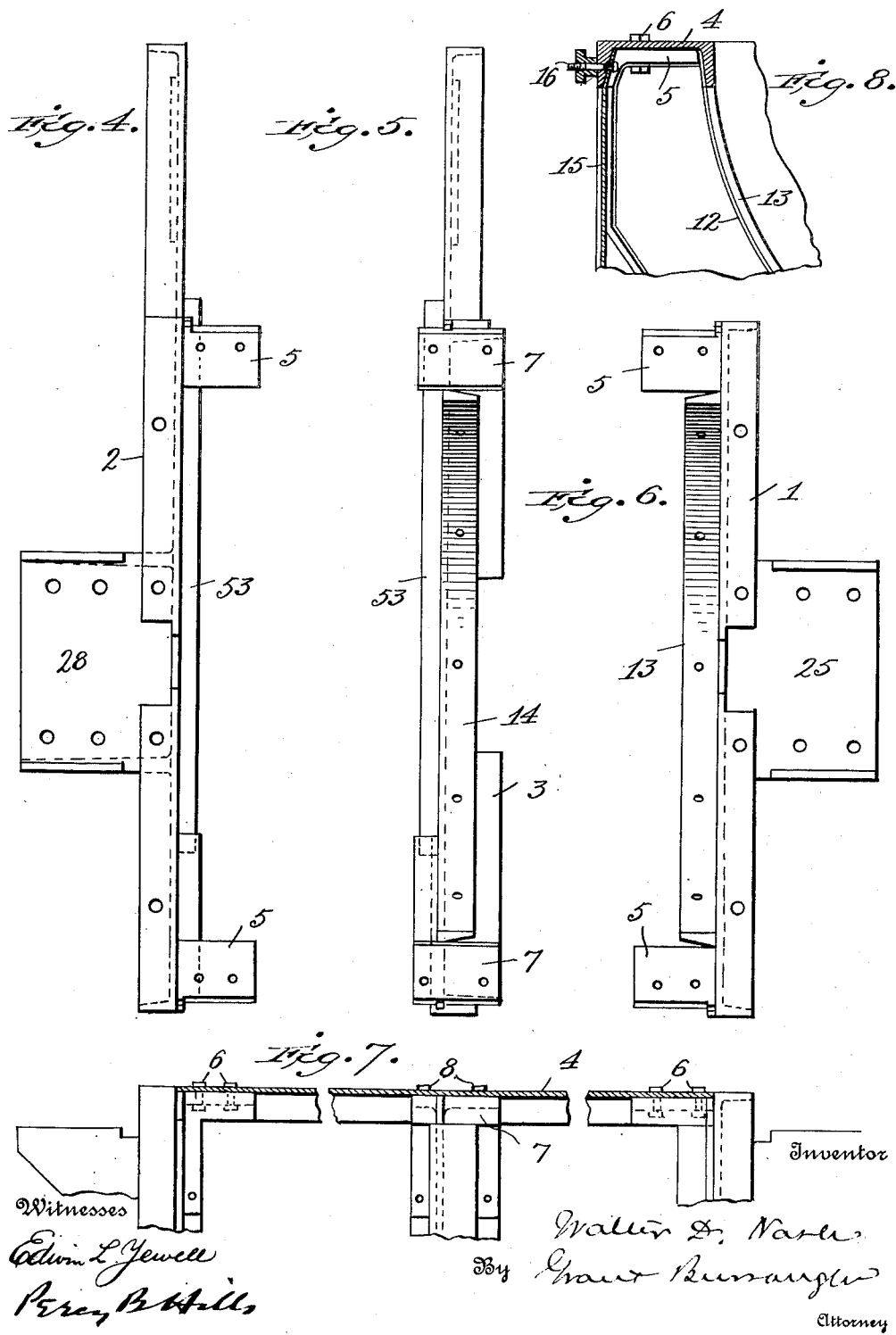

W. D. NASH.
COTTON CLEANING MACHINE.
APPLICATION FILED NOV. 9, 1912.

1,058,997.

Patented Apr. 15, 1913.

Witnesses
Edwin L. Yewell
Percy B. Hill

Inventor
Walter D. Nash
By Grant Burroughs
Attorney

UNITED STATES PATENT OFFICE.

WALTER D. NASH, OF ATLANTA, GEORGIA, ASSIGNOR TO ATLANTA UTILITY WORKS, OF EAST POINT, GEORGIA, A CORPORATION OF GEORGIA.

COTTON-CLEANING MACHINE.

1,058,997.  Specification of Letters Patent.  Patented Apr. 15, 1913.

Application filed November 9, 1912. Serial No. 730,453.

*To all whom it may concern:*

Be it known that I, WALTER D. NASH, a citizen of the United States, and resident of Atlanta, in the county of Fulton and State of Georgia, have invented certain new and useful Improvements in Cotton-Cleaning Machines, of which the following is a specification.

The invention relates to that class of machines which are employed in freeing cotton waste and other low grade fibrous materials from dirt and other foreign matter, thereby conditioning such materials so that they can be utilized in textile manufacture.

It consists in the novel construction, combination and arrangement of parts hereinafter described, pointed out in the appended claims and illustrated in the accompanying drawings.

Figure 3:
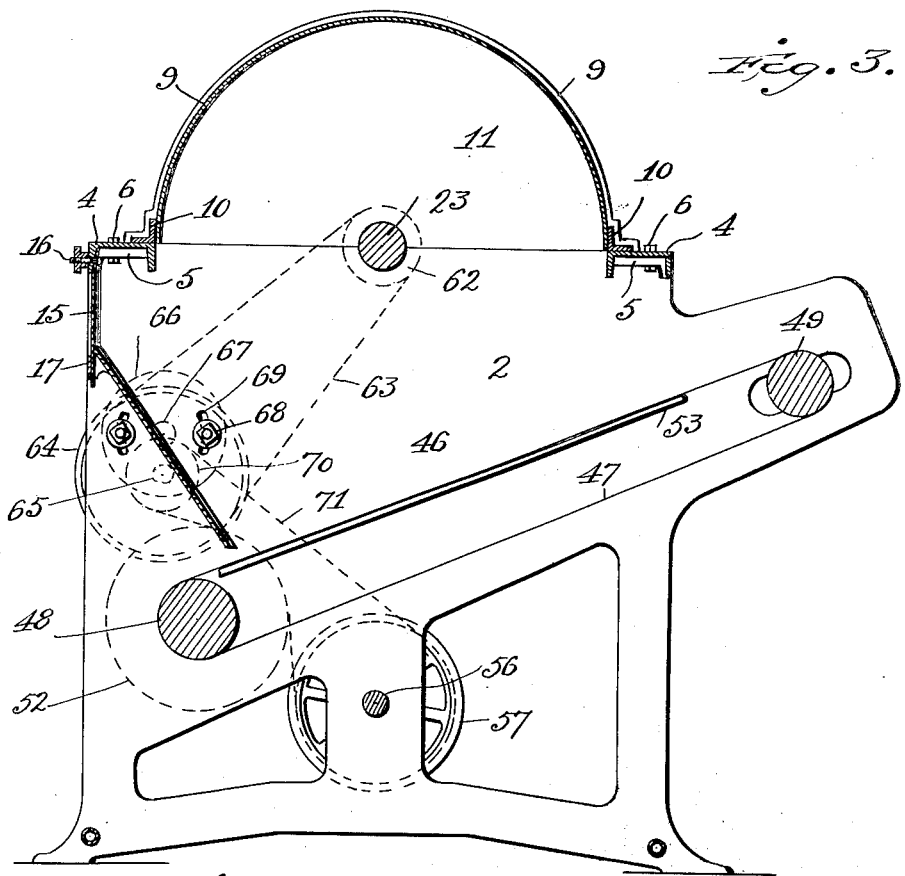
Figure 9:
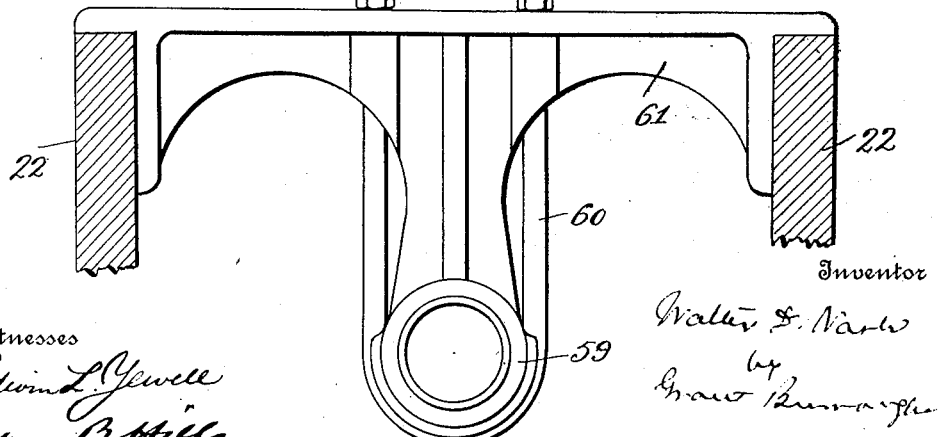
Figure 13:
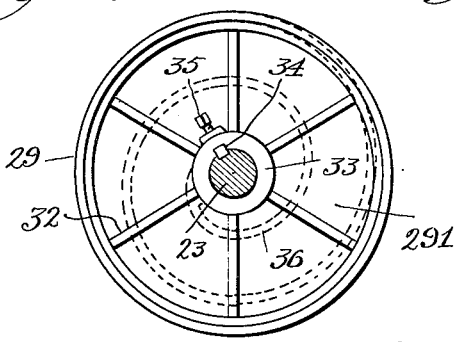
Figure 14:
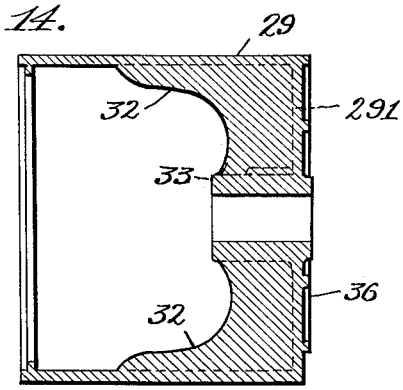
Figure 15:
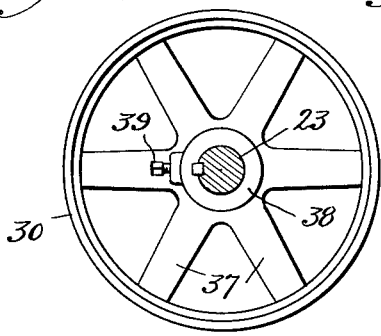
Figure 16:
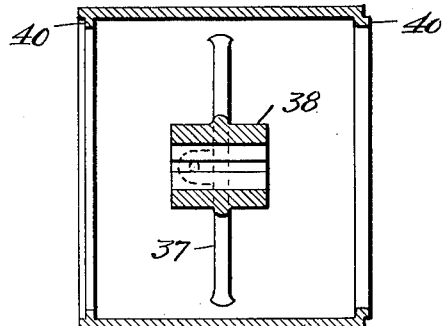
Figure 18:
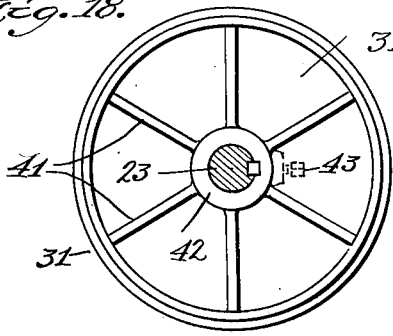
Figure 17:
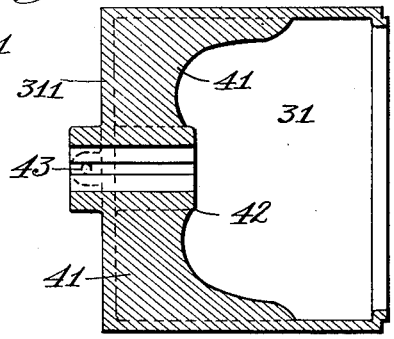
Figure 19:
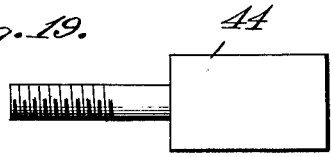
Figure 20:
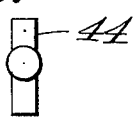

In the drawings, in which similar reference characters designate corresponding parts, Figure 1 is a side elevation, broken away in part, of a cotton cleaning machine embodying the invention. Fig. 2 is a cross-section on the line 2—2 of Fig. 1. Fig. 3 is a cross-section on the line 3—3 of Fig. 1. Figs. 4–7 are detail views showing several of the frames of the housing. Fig. 8 is an enlarged detail sectional view showing the frame structure at one of the corners. Fig. 9 is an enlarged detail view showing the hanger for supporting an end of the shaft for the screw conveyer. Figs. 10–12 are detail views of the hanger in which the countershaft is journaled. Fig. 13 is an end view of one of the end sections of the drum. Fig. 14 is a longitudinal sectional view of the same. Fig. 15 is an end view of the intermediate section of the drum. Fig. 16 is a longitudinal sectional view of the same. Fig. 17 is a longitudinal sectional view of the other end section of the drum. Fig. 18 is an end view of the same. Figs. 19—20 are detail views of one of the beater pins.

The housing of the machine comprises the end frames 1, 2, and the intermediate frame 3. Extending along the tops of these frames, at their corners, are the channel bars 4, one on each side (Figs. 4 to 8). At each upper corner of each end frame is a projection 5 to fit in the recess in the end of the channel bar, where the projection and bar are secured together by the bolts 6 (Fig. 7). On each upper outer corner of the intermediate frames is the projection 7 to fit the recess in the under side of the channel bar by the bolts 8.

Extending over the top of the machine is the semi-cylindrical hood 9 (Figs. 1–3) secured at its edges to the inner edges of the channel bars 4 by the angle strips 10. The ends of the hood are closed by the end plates 11 secured on the top edges of the end frames 1, 2. A curved foraminous plate 12 forms the cylindrical complement of the hood 9. The longitudinal edges of this foraminous plate are secured to the inner edges of the channel bars 4; the transverse edge of the plate at one end is secured to the semi-circular flange 13 (Fig. 6) on the inner face of the end frame 1, and the transverse edge at the other end of the foraminous plate is secured to the semi-circular flange 14 of the intermediate frame 3 (Fig. 5). The intermediate frame 3 is cut away above the flange 14. The hood 9 and the foraminous plate 12 form a cylindrical casing or chamber extending between the frames 1 and 3, said chamber being closed at one end by the plate 11 and the frame 1, and open at the other end into the space or chamber between the end frame 2 and the intermediate frame 3.

Extending along the upper edges of the frames 1, 2 and 3 are the side plates 15. The upper edge of each side plate is fastened to the inner face of the outer flange of the adjacent channel bar by the bolts 16. (Figs. 2, 3, 8). The lower edge of each side plate is reinforced by the longitudinal batten 17. Projecting downwardly and inwardly from the lower edges of the side plates 15 are the inclined sides 18 reinforced by the longitudinal battens 19 and the cross battens 20. These inclined sides only extend between the frames 1 and 3, and the spaces between their ends are closed by such frames to form a lower chamber beneath the foraminous plate 12. One of the inclined sides 18 is hinged, as at 21, to form a door that can be swung inwardly to give access to the lower chamber. The inclined sides 18 form guides to the trough 22 mounted at its ends in the frames 1 and 3.

Extending longitudinally through the cylindrical cleaning chamber, formed by the hood 9 and the foraminous plate 12, is the shaft 23. This shaft is journaled at one end in the bearing blocks 24 carried by the shelf 25 (Fig. 6) projecting from the outer face of the frame 1. On this end of the shaft are the fast and loose pulleys 26 to engage the driving belt by which power is imparted to the machine. The other end of the shaft is journaled in the bearing blocks 27 mounted on the shelf 28 (Fig. 4) projecting from the outer face of the frame 2.

On the shaft 23 within the cylindrical cleaning chamber is mounted the drum comprising the end and intermediate sections 29, 30, 31. These sections are hollow cylindrical castings of equal diameter so assembled and secured on the shaft 23 as to form a closed drum with a smooth continuous periphery. The outer end of the section 29 (Fig. 13, 14) is closed by the head 291, and inside of the head are the arms 32 radiating from the hub 33. The wall of the section, the head, arms and hub are all integral. Each arm is web-shaped and extends a considerable distance into the section to give the required strength. The section is splined on the shaft by a key 34 inserted in coincident ways in the hub and shaft. The section is firmly held in place on the shaft by the set-screw 35 passing through the hub 33 and impinging on the key 34. The section 29 is adjusted on the shaft 23 so as to leave but little space between its outer end and the end frame 1 and end plate 11 of the housing. Fitting in this space between the end of the section 29 and plate 11 is the shallow spiral 36 on the head 291 of the section. The spiral of this conveyer leads from the hub of the section outward to its periphery. The conveyer operates to carry outwardly any material that may drop into the space between the head of the drum and frame 1 and the plate 11. This will prevent packing of the material around the shaft in such space. Without this spiral conveyer some of the material being treated would tend to collect and pack around the shaft at that point, and through the heat generated by friction during the operation of the machine might become ignited. The intermediate drum section 30 (Figs. 15, 16) is carried by the arm 37 radiating from the hub 38 splined on the shaft 23, and is secured on the shaft by the set-screw 39 passing through the hub and impinging on the key forming the spline. The wall of this section, the arms and hub are integral. The ends of this section are flanged and grooved, as at 40, to engage the similarly shaped ends of the other sections 29, 31. This engagement of the ends of the sections holds them firmly together in the proper relative positions, and gives a smooth continuous surface to the periphery of the drum. While only one intermediate section is shown, yet it is obvious that several may be used, depending upon the length of the drum. The outer end of the other end drum section 31 (Figs. 17, 18) is closed by the head 311 and the section is carried by the arms 41 radiating from the hub 42 splined on the shaft 23. It is secured on the shaft by the set-screw 43 passing through the hub and impinging on the key forming the spline. The arms 41 are web-shaped and extend a considerable distance into the section to give the required strength. It is to be observed that the hub 42 projects beyond the outer end of the section and through this projection the set-screw 43 extends. The wall of this section, the head, arms and hub are also integral.

In assembling the sections on the shaft 23 in setting up the drum, the front-end section 29 is first placed on the shaft and adjusted. To turn down the set-screw 35, access to the same can be had through the rear open end of the section. Next, the intermediate section 30 is placed on the shaft with its flanged and grooved front edge registering with the grooved and flanged rear edge of the section 29. Access to the screw 39 to set the same can be had through the rear open end of the section 30. Finally, the rear end section 31 is placed on the shaft with its grooved and flanged front edge registering with oppositely flanged and grooved edge of the intermediate section. As the set-screw 43 passes through the projection of the hub 42 extending outside of the drum, access can be readily had to the set-screw to set the same. A drum so constructed will be closed at all points so that dust and dirt cannot enter the same. An accumulation of extraneous matter within the drum would destroy its balance and, as a result, more driving power would be required to rotate the same.

Spirally arranged on the surface of the drum are the beater pins 44 (Figs. 1, 19, 20). Each of these pins comprises a threaded shank to pass through the wall of the drum to receive a nut on the inside of the drum, and a rectangular head to project above the surface of the drum. The heads of the pins project into the annular space between the drum and the cylindrical casing formed by the hood 9 and the foraminous plate 12. The face of each pin-head is inclined to follow the general spiral direction of the pins, and when the drum is rotated the pins not only serve to beat the material but also act to convey the material from the feeding-in end of cylindrical casing to the discharge end.

On the front or feeding-in end of the hood 9 is the hopper 45, through which the material to be treated is fed into the machine.

At the rear end of the machine, in the chamber 46 between the frames 2 and 3, is the discharge apron 47 beneath the discharge end of the drum. This apron is carried at its opposite ends by the rolls 48, 49 journaled between the frames 2, 3. The bearings 50 (Fig. 2) of the roll 49 are adjustable through the set-screws 51 so that the tension of the apron may be regulated. The apron is driven by the pulley 52 on the shaft of the roll 48. The upper fold of the apron travels along the ledges 53 projecting from the frames 2 and 3 (Figs. 4 and 5), which prevent the apron from sagging.

Extending along the bottom of the trough 22 (Fig. 2) is the curved plate 54 semi-circular in cross-section. In this trough, cooperating with the plate 54 is the screw-conveyer 55 on the shaft 56 driven by the pulley 57. At one end this shaft is journaled in the bearing 58 (Fig. 1) in the frame 3, and at the other end it is journaled in the sleeve 59 (Fig. 9) carried by the yoke 60 and bracket 61. The bracket rests on and against the sides of the trough 22. By means of this construction the end of the shaft is properly supported in the end of the trough, and at the same time the support offers no obstruction to the passage of material moved by the screw conveyer to be discharged at the end of the trough.

On the rear end of the driving shaft 23 is the pulley 62 (Figs. 1, 3), which is connected by the belt 63 with the pulley 64 on the counter-shaft 65. This counter-shaft is journaled in the hanger 66 pivoted on the end frame 2 (Figs. 10–12). The pivotal point of the hanger, as at 67, is eccentric to the bearings of the counter-shaft 65, so that by turning the hanger the tension of the belt 63 can be regulated. The hanger is held in its adjustments by the clamping bolts 68 passing through its base and the slots 69 in the end frame 2 (Fig. 3), which slots are curved concentric with the pivot 67 of the hanger. On the counter-shaft 65 is another pulley 70, from which leads the belt 71 over the pulley 52 and around the pulley 57. By adjusting the hanger 66 the tension of the belt 71 can be regulated also. Power is transmitted from the driving shaft 23 through the pulley 62, belt 63 and pulley 64 to the counter-shaft 65. From the pulley 70 on the counter-shaft power is transmitted by the belt 71 to the pulley 52 to drive the apron 47, and to the pulley 57 to drive the screw conveyer 55.

The machine having been put in motion, its operation is as follows: The waste cotton is fed into the hopper 45, from which it passes into the cylindrical chamber formed by the hood 9 and foraminous plate 12. In this chamber the material is thoroughly disintegrated and beaten to free it from any dirt or trash that it might contain. The extraneous matter freed from the fiber falls to the bottom of the chamber and passes through the foraminous plate into the chamber beneath, from which chamber it is guided by the inclined sides 18 into the trough 22. The screw conveyer in the trough carries the extraneous matter to the front of the machine, where it is discharged. The material is conveyed through the cylindrical chamber by the spiral arrangement of the beater pins 44 and discharged from the rear end of the chamber onto the apron 47 which carries the cleaned fiber from the machine. In its passage through the machine the material is not only thoroughly freed from extraneous matter, but also any matted bunches of the material are broken up and the fibers are separated and straightened out so that the material leaves the machine in a light fluffy mass suitable for further textile purposes.

Having thus described my invention, what I claim and desire to secure by Letters Patent is:

1. In a cotton cleaning machine, a horizontally disposed cylindrical casing comprising an imperforate hood and a foraminous bottom, said casing being closed at the feed end and open at the discharge end, a drum rotatable in the cylindrical casing having a closed head adjacent to the closed end of the casing, a shallow spiral conveyer on the head of the drum between such head and the adjacent closed end of the casing, and a hopper communicating with the feed end of the casing above the spiral conveyer.

2. In a cotton cleaning machine, a housing comprising end frames and an intermediate frame, a hood semi-circular in cross-section extending over the upper ends of said frames, a foraminous plate semi-circular in cross-section constituting with the hood a cylindrical casing extending between one of the end frames and the intermediate frame and with the foraminous plate forming the bottom of the cylindrical casing, said casing being closed at one end by the end frame and opening at the other end into the space between the intermediate and the other end frame, a drum rotatable in said cylindrical casing, beater pins spirally arranged on the periphery of the drum, a conveyer at the open end of the casing in the space between the intermediate frame and the opposite end frame, a receptacle fixed in the housing beneath the foraminous bottom, and a conveyer in said receptacle.

3. In a cotton cleaning machine, a housing, a cylindrical chamber with a foraminous bottom fixed in said housing, a drum rotatable in said chamber, beater pins on the periphery of said drum, a frame closing an end of the chamber adjacent to an end of the drum, and a spiral conveyer in the space between said frame and the adjacent end of the drum.

4. In a cotton cleaning machine, a rotatable drum, a frame adjacent to the end of the drum, and a shallow spiral rib on the end of the drum forming a conveyer between the drum and the adjacent frame.

5. In a cotton cleaning machine, a housing comprising end frames and an intermediate frame, a hood semi-circular in cross-section extending over the upper ends of said frames, a foraminous plate semi-circular in cross-section constituting with the hood a cylindrical casing extending between one of the end frames and the intermediate frame, said casing being closed at one end by the end frame and opening at the other end into the space between the intermediate frame and the other end frame, a drum rotatable in said casing, beater pins spirally arranged on the periphery of the drum, a conveyer at the open end of the casing in the space between the intermediate frame and the end frame, inclined sides fixed in the housing below said casing to form a lower chamber beneath the foraminous plate, a trough on the bottom of said lower chamber, and a conveyer in said trough.

In testimony whereof I hereunto affix my signature in the presence of two witnesses.

WALTER D. NASH.

Witnesses:
JAS. W. AUSTIN,
W. L. M. AUSTIN.